US011428316B2

(12) United States Patent
Fraim et al.

(10) Patent No.: US 11,428,316 B2
(45) Date of Patent: Aug. 30, 2022

(54) METHOD OF ENGAGING TWO GEAR ELEMENTS, AND A DRIVE DEVICE IMPLEMENTING SUCH A METHOD

(71) Applicant: SAFRAN LANDING SYSTEMS, Velizy Villacoublay (FR)

(72) Inventors: Julien Fraim, Moissy-Cramayel (FR); Frédérik Giraud, Moissy-Cramayel (FR); Frédéric Martin, Moissy-Cramayel (FR); Alexandre Veillon, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 394 days.

(21) Appl. No.: 16/366,485

(22) Filed: Mar. 27, 2019

(65) Prior Publication Data
US 2019/0301603 A1    Oct. 3, 2019

(30) Foreign Application Priority Data
Mar. 28, 2018   (FR) ...................................... 18 52678

(51) Int. Cl.
*F16H 63/00*       (2006.01)
*F16H 63/30*       (2006.01)
(Continued)

(52) U.S. Cl.
CPC ............ *F16H 63/3023* (2013.01); *F16H 3/34* (2013.01); *F16H 61/30* (2013.01); *B64C 25/405* (2013.01);
(Continued)

(58) Field of Classification Search
CPC ........ F16H 63/3023; F16H 3/34; F16H 61/30; F16H 55/10; F16H 61/0403;
(Continued)

(56) References Cited

U.S. PATENT DOCUMENTS 3,762,670 A * 10/1973 Chillson ................. B64C 25/36
                                                                            244/50
3,807,664 A *  4/1974 Kelly, Jr. .............. B64C 25/405
                                                                            244/50
(Continued)

FOREIGN PATENT DOCUMENTS

FR      2 901 334 A1     11/2007
FR        2901334 A1 *   11/2007  ............. F16D 11/10

OTHER PUBLICATIONS

French Preliminary Search Report issued in FR 1852678 dated Dec. 18, 2018.

*Primary Examiner* — Victor L MacArthur
(74) *Attorney, Agent, or Firm* — Sughrue Mion, PLLC

(57) ABSTRACT

The invention provides an engagement method for engaging a first gear element with a second gear element, at least the second gear element being mounted to move between a meshing position and a disengaged position by means of an actuator. The engagement method including a step of driving at least one of the gear elements in rotation so as to establish a non-zero difference in speed of rotation between said gear elements, and a step of controlling the actuator to perform the following in succession:
  moving at least the second gear element towards the meshing position;
  on detecting contact between the gear elements, stopping the movement of the second gear element; and
  on detecting an ideal angular position for engaging said gear elements, moving the second gear element as quickly as possible into the meshing position.

12 Claims, 4 Drawing Sheets

(51) Int. Cl.
*F16H 61/30* (2006.01)
*F16H 3/34* (2006.01)
*F16H 61/28* (2006.01)
*F16H 55/10* (2006.01)
*B64C 25/40* (2006.01)
*F16H 61/04* (2006.01)

(52) U.S. Cl.
CPC ...... *F16H 55/10* (2013.01); *F16H 2061/0474* (2013.01); *F16H 2061/2823* (2013.01); *F16H 2063/3093* (2013.01)

(58) Field of Classification Search
CPC ..... F16H 2061/0414; F16H 2061/0422; F16H 2061/047; F16H 2061/0474; F16H 2063/3093; F16H 2061/2823; F16H 63/40; B64C 25/405; Y02T 50/80; H02K 7/116
USPC ............................ 301/6.2; 180/65.51; 74/354
See application file for complete search history.

(56) References Cited

U.S. PATENT DOCUMENTS

| | | | |
|---|---|---|---|
| 10,112,703 B2 * | 10/2018 | Wilson | B64C 25/34 |
| 10,124,887 B2 * | 11/2018 | Didey | B64C 25/34 |
| 10,144,506 B2 * | 12/2018 | Didey | F16H 1/24 |
| 10,421,535 B2 * | 9/2019 | Didey | B64C 25/405 |
| 10,486,800 B2 * | 11/2019 | Didey | B64C 25/405 |
| 2012/0145504 A1 | 6/2012 | Moorman et al. | |
| 2012/0312112 A1 * | 12/2012 | Tizac | B64C 25/405 |
| | | | 74/354 |
| 2013/0200210 A1 * | 8/2013 | Oswald | F16H 48/32 |
| | | | 244/50 |
| 2014/0260795 A1 * | 9/2014 | Gray | F02N 11/0851 |
| | | | 74/7 E |
| 2015/0210385 A1 * | 7/2015 | Didey | B64C 25/34 |
| | | | 244/50 |
| 2016/0039519 A1 * | 2/2016 | Didey | F16H 1/06 |
| | | | 244/103 S |
| 2017/0101173 A1 | 4/2017 | Morris | |
| 2017/0106974 A1 * | 4/2017 | Morris | B64C 25/405 |
| 2017/0211690 A1 | 7/2017 | Lygner et al. | |

* cited by examiner

METHOD OF ENGAGING TWO GEAR ELEMENTS, AND A DRIVE DEVICE IMPLEMENTING SUCH A METHOD

The present invention relates to the field of motor-driven motion transmission, and more particularly to a method of engaging two gear elements. The invention also provides a drive device, particularly but not exclusively and aircraft wheel, implementing such a method.

TECHNOLOGICAL BACKGROUND OF THE INVENTION

In the field of aviation, it is now the practice to fit aircraft with members for driving wheels in rotation so as to enable an aircraft to move on the ground without using its main engines. Drive members mounted on an undercarriage are described in Documents WO 2011/023505 and WO 2015/033160. Those drive members comprise an electric motor connected to reduction gearing having an outlet fitted with a pinion that may be a roller pinion. The pinion co-operates with a toothed ring secured to the wheel of the aircraft. In that way, the electric motor drives the pinion in rotation, which, in turn, drives the toothed ring and thus the wheel so as to move the aircraft.

For reasons of safety, particularly during takeoff and landing of the aircraft, provision is made to separate the pinion from the toothed ring. For that purpose, actuator means serve to move the pinion between a disengaged position in which the pinion is remote from the toothed ring, and a meshing position in which the pinion drives said ring in rotation.

Nevertheless, while the rotating pinion is being engaged with the ring, a peripheral portion of at least one of the rollers of said pinion strikes against top portions of the teeth of the ring, thereby giving rise to point forces of large values that pass through all of the drive members and also through the structure of the aircraft undercarriage. To avoid any degradation of those drive members (such as for example breaking a tooth of the ring or indeed causing a roller of the pinion to malfunction), said members are generally oversized, which increases the weight and thus the cost of said members.

OBJECT OF THE INVENTION

An object of the invention is thus to propose means for limiting the forces that pass through two gears while they are being coupled together, and to obviate the above-mentioned drawbacks, at least in part.

SUMMARY OF THE INVENTION

To this end, the invention provides an engagement method for engaging a first gear element with a second gear element, at least the second gear element being mounted to move between a meshing position and a disengaged position by means of an actuator.

According to the invention, the engagement method includes a step of driving at least one of the gear elements in rotation so as to establish a non-zero difference in speed of rotation between said gear elements. The method also includes a step of controlling the actuator to perform the following in succession:
moving at least the second gear element towards the meshing position;
on detecting contact between the gear elements, stopping the movement of the second gear element; and
on detecting an ideal angular position for engaging said gear elements, moving the second gear element as quickly as possible into the meshing position.

Stopping the movement of the second gear element on detecting contact serves to limit the contact force between the two gear elements while waiting for said elements to move into phase in order to bring the second gear element into the meshing position.

In a preferred embodiment of the invention, the actuator comprises an actuator having a rod controlled by a servovalve and connected to the second gear element. Thus:
increasing the flow rate through the servovalve makes it possible to reach a predetermined pressure and to move the rod of the actuator towards the meshing position;
raising the pressure up to a first threshold enables contact between the gear elements to be detected and changing the flow rate through the servovalve then enables the movement of the rod of the actuator to be stopped; and
lowering the pressure down to a second threshold for a predefined duration serves to detect an ideal angular position for engaging the gear elements, and increasing the flow rate through the servovalve up to a maximum flow rate then serves to bring the rod of the actuator into the meshing position.

According to a particular characteristic, the first pressure threshold is substantially equal to 30 bars.

According to another particular characteristic, the second pressure threshold is substantially equal to 20 bars.

In particular manner, the predefined duration of the second pressure threshold is substantially equal to 100 milliseconds (ms).

The invention also provides a drive device comprising:
a first gear element;
a second gear element movable by means of an actuator between a meshing position with the first gear element and a disengaged position;
a motor driving one of the gear elements in rotation;
detector means for detecting contact between said gear elements; and
an electronic control unit connected to the actuator, to the motor, and to the detection means.

According to the invention, the electronic control unit is arranged to perform the above method.

In a preferred embodiment of the invention, the actuator comprises an actuator having a rod connected to the second gear element, a servovalve controls the actuator, and the detector means comprise a pressure sensor.

According to a particular characteristic, the actuator is a hydraulic actuator.

According to another particular characteristic, the motor is an electric motor.

In a preferred embodiment of the invention, the first gear element is a toothed ring and the second gear element is a roller pinion.

In particular manner, the toothed ring is secured to a wheel.

The invention also provides an undercarriage fitted with such a device.

DESCRIPTION OF THE FIGURES

The invention can be better understood in the light of the following description, which is purely illustrative and non-limiting, and which should be read with reference to the accompanying figures, in which.

DETAILED DESCRIPTION OF A PARTICULAR EMBODIMENT OF THE INVENTION

Figure 1:
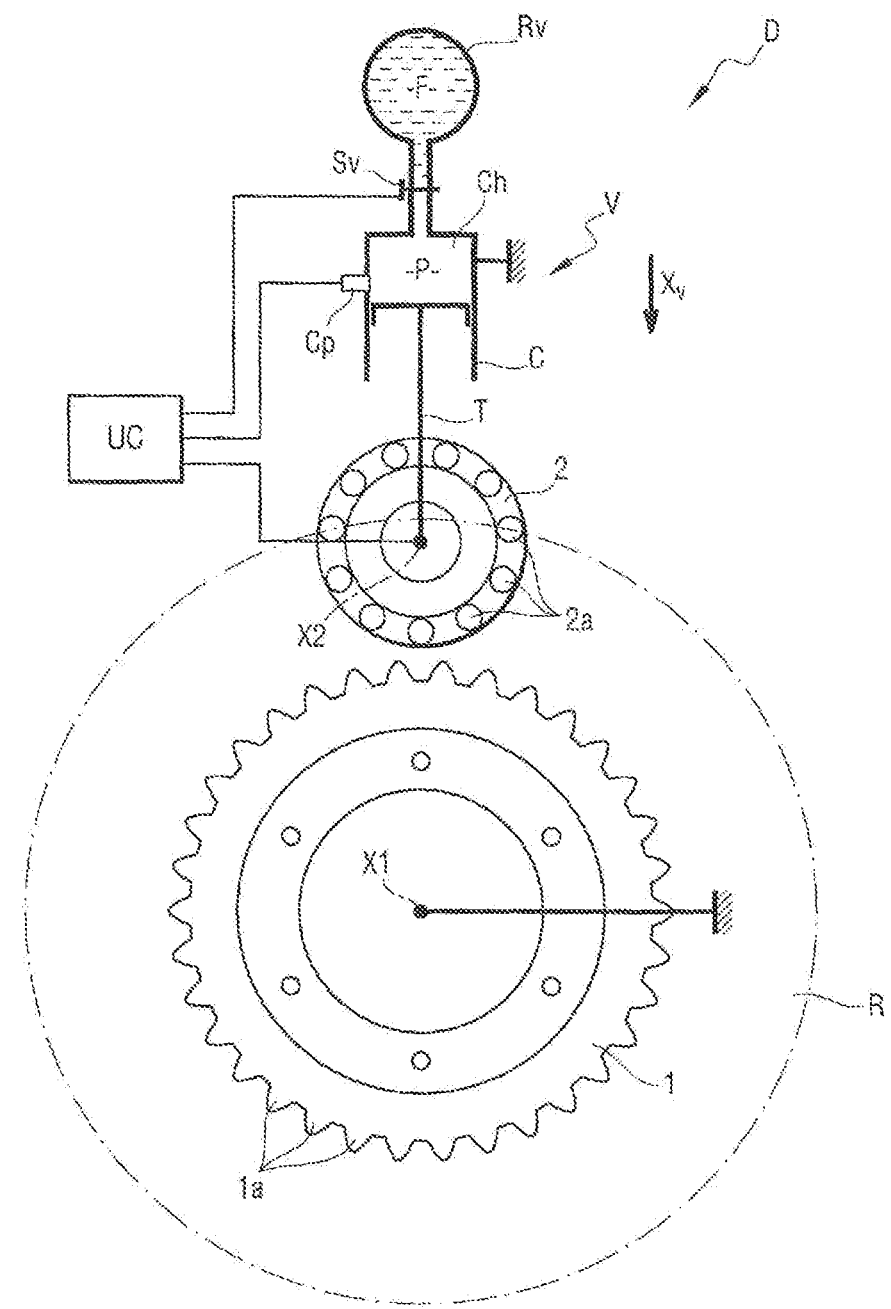
FIG. 1 is a diagram showing a drive device in a particular embodiment of the invention, the second gear being in the disengaged position.

With reference to FIG. 1, an aircraft undercarriage has a drive device D in a particular embodiment of the invention. The undercarriage has a leg with a strut provided with means for connecting it to the structure of the aircraft and a rod that is slidable within the strut and that has a free end provided with a hub of a wheel R.

The drive device D comprises a toothed ring 1 having a row of teeth 1a. The ring 1 forms a first gear element, which is secured to the wheel R of the aircraft, the ring 1 and the wheel R having the same axis of rotation X1.

The drive device D also has a pinion 2 having a plurality of rollers 2a uniformly distributed around an axis of rotation X2 that is parallel to the axis of rotation X1. The pinion 2 having rollers 2a forms a second gear element that is secured to an outlet shaft of reduction gearing associated with an electric motor.

The pinion 2 is connected at the axis of rotation X2 to a free end of a rod T of a hydraulic actuator V. The actuator V comprise a cylinder C secured to the undercarriage and within which the rod T can move along an axis Xv that is orthogonal to the axes of the rotation X1 and X2. An end of the rod T forming a piston co-operates with the cylinder C of the actuator to define a chamber Ch. The chamber Ch is connected via a servovalve Sv to a supply Rv containing a fluid F under pressure. The servovalve Sv serves to control pressure P inside the chamber Ch of the actuator V, i.e. to control movement Dp of the rod T.

Figure 2A:
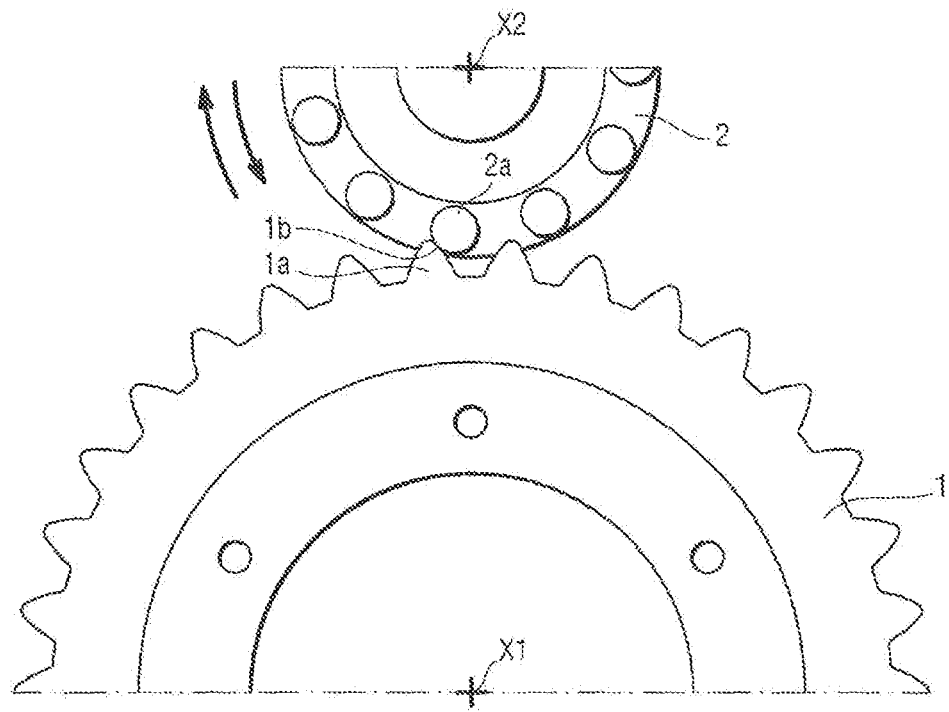
FIG. 2a is a fragmentary view of the device shown in FIG. 1, in which the first gear element and the second gear element are in contact, the second gear element being between the disengaged position and the meshing position.
Figure 2B:
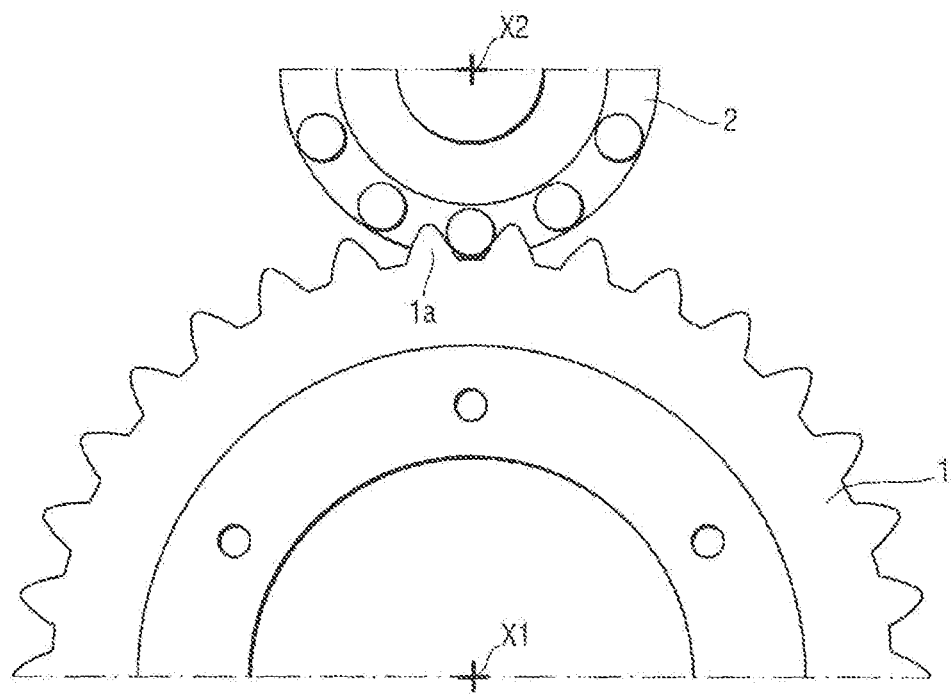
FIG. 2b is a fragmentary view of the device shown in the FIG. 1, in which the second gear element is in the meshing position.

The pinion 2 is thus mounted to move between a disengaged position as shown in FIG. 1, in which the pinion 2 is spaced apart from the ring 1, and a meshing position as shown in FIG. 2b in which the pinion 2 is in phase with the ring 1 in order to mesh therewith.

An electronic control unit UC is connected to the servovalve Sv, to the electric motor, and to a pressure sensor Cp that passes in sealed manner through the cylinder C of the actuator V in order to measure the pressure P inside the chamber Ch of the actuator V.

There follows a description of the method of engaging the pinion 2 with the ring 1.

Figure 3:
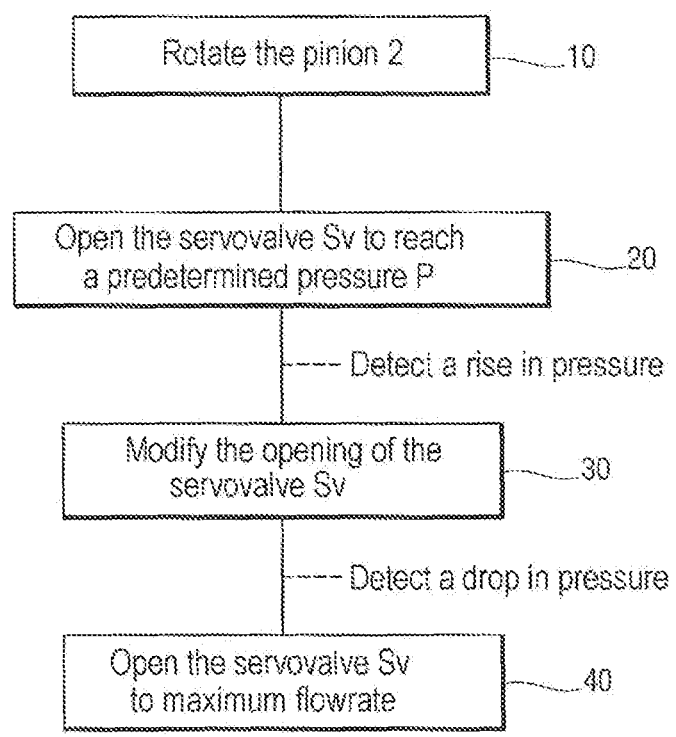
FIG. 3 is a diagram of the method of the invention.

As shown in FIG. 3, a first step 10 consists in the control unit UC controlling the electric motor so as to drive the pinion 2 in rotation so as to establish a non-zero speed difference between said pinion 2 and the ring 1. The speed difference is preferably greater than 3 revolutions per minute (rpm) in order to avoid a roller 2a of the pinion 2 facing a tooth 1a of the ring 1 permanently. This difference corresponds substantially to the sum in absolute value of the measurement inaccuracies and the controls for controlling the speeds of rotation of the pinion and of the ring. It may also be preferable to limit this speed difference or indeed the torque delivered by the electric motor in order to minimize forces at the moment contact is made between the ring 1 and the pinion 2. This limitation may also be determined as a function of the design of the pinion and of the ring, or indeed of the performance that is required of the drive device. Thus, a speed difference that is substantially equal to 4 rpm is preferred.

During a second step 20, the flow through the servovalve Sv is increased by the control unit UC so as to reach a pressure inside the chamber Ch of the actuator V that is sufficient for moving the rod T of the actuator V. The pinion 2 then moves at a substantially constant speed towards the meshing position, until one of the rollers 2a of the pinion 2 comes into contact with a top portion 1b of a tooth 1a of the ring 1 (FIG. 2a). Since the speed difference between the pinion 2 and the ring 1 is not zero, the roller then slides along the top portion 1b of the tooth 1a.

At that moment, the control unit UC detects via the pressure sensor a rise of pressure in the chamber Ch of the actuator V caused by the pinion 2 making contact with the ring 1, thereby constraining the movement Dp of the rod T. When the pressure rise is greater than a first threshold S1, the control unit UC acts during a first step 30 to change the flow rate through the servovalve Sv so as to stop the rod T advancing towards the meshing position. The third step 30 thus serves to limit the contact forces between the pinion and the ring, and consequently to limit these forces that pass through the various elements of the device and the structure of the undercarriage. Preferably, the first threshold S1 is substantially equal to 30 bars. This value may be defined in particular as a function of the pressure needed to move the rod T of the actuator V, which pressure depends, amongst other things, on the travel speed that is desired and on the design of the actuator V (friction between the rod T and the chamber Ch of the actuator V, . . . ).

For this purpose, the roller 2a moving up or down along the top portion 1b of the tooth then gives rise to the pressure P inside the chamber Ch of the actuator V respectively rising or falling.

As a result, the pressure inside the chamber Ch of the actuator V oscillates with amplitudes greater than the first threshold S1.

Since the advance of the rod is limited by the flow rate through the servovalve, and since relative rotation continues, the roller 2a thus ends up by being no longer in contact with the tooth, so that it lies between two teeth. At the same time, the pressure inside the chamber then stops oscillating and decreases down to a second threshold S2. The second threshold S2 is preferably substantially equal to 20 bars.

The control unit then detects, via the pressure sensor Cp, the pressure P inside the chamber Ch of the actuator V lowering down to the second threshold S2. If the pressure remains lower than the second threshold S2 for a predefined duration t, the flow rate through the servovalve is then increased during a fourth step 40 up to a maximum flow rate so as to move the rod quickly towards the meshing position. Preferably, the duration t is substantially equal to 100 ms.

Since the wheel 2 is then substantially in phase with the ring 1, the rapid movement Dp of the rod T of the actuator V enables the pinion 2 to reach the meshing position. At that point, the pressure P inside the chamber of the actuator V increases until it reaches substantially the pressure of the fluid F contained in the supply Rv.

Figure 4:
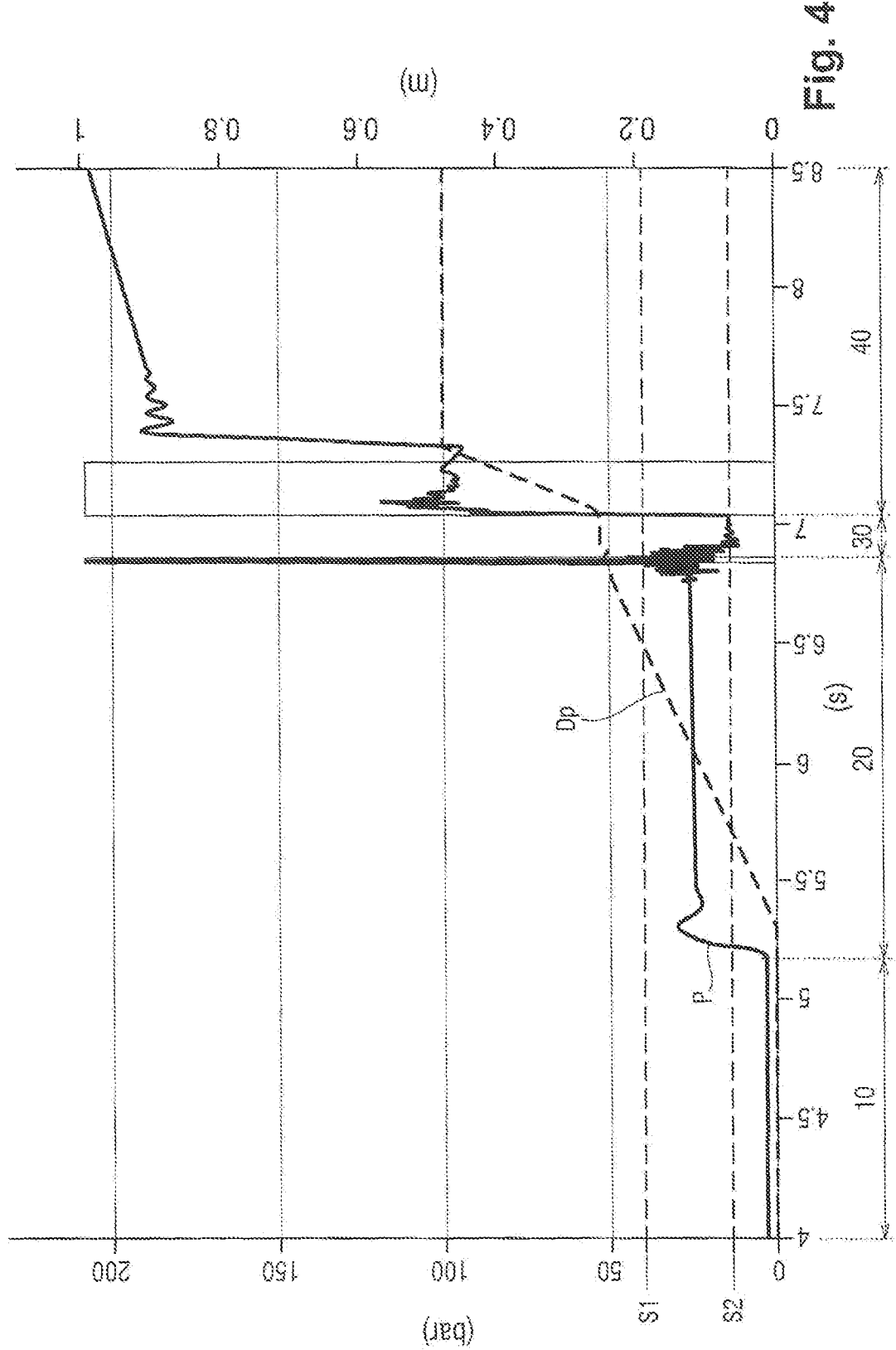
FIG. 4 shows the movement of the actuator rod and the pressure that exists within the actuator as a function of time while performing the method of the invention as shown in FIG. 3.

FIG. 4 shows the movement Dp of the rod T of the actuator V between the disengaged position and the meshing position, and also how the pressure P inside the chamber Ch of the actuator V varies during the steps 10, 20, 30, and 40.

It is also possible to determine the ideal angular position for the pinion 2 engaging the ring 1 by calculating the moment when said pinion and said ring 1 are substantially in phase after contact has been detected between them. Various parameters then need to be taken into account: the dimensions and the spacing of the teeth 1*a* of the ring 1, the speed of rotation of the pinion 2 relative to the ring 1, the position of the point of impact of the roller 2*a* on the tooth 1*a*, etc. . . . .

The drawback of determining the ideal angular position in that way lies in the accuracy of the calculation depending directly on the position of the point of impact of the roller 2*a* against the tooth 1*a*, which position is arbitrary under such circumstances.

Naturally, the invention is not limited to the implementations described and covers any variant coming within the ambit of the invention as defined by the claims.

The positions of the pinion 2 and the ring 1 within the drive device D may in particular be interchanged.

Although in this example the second gear element is a roller pinion, it is possible to envisage some other type of pinion, e.g. such as a pinion having teeth.

Although in this example the movement for causing the pinion to engage the ring is movement in translation, it is also possible to envisage movement in rotation.

The axis Xv along which the rod T of the actuator V moves need not be orthogonal to the axis of rotation X1 of the toothed ring.

Likewise, although the engagement between the pinion and the ring in this example is radial, it could very well be axial or tangential (as applies in particular to bevel gears).

Although the actuator V in this example is hydraulic, it is entirely possible to envisage using a pneumatic actuator associated with a solenoid valve in order to obtain operations similar to that described above.

It is also possible to replace the actuator V and the servovalve Sv with an electromechanical actuator, such as for example an electric motor associated with a mechanical chain connected to the pinion. Blocking the motor in position or at a zero speed then serves to stop movement of the pinion. By way of example, contact between the pinion and the ring can then be detected by using force sensors arranged in said mechanical chain (strain gauge bridges) or indeed by observing variation in the electrical power delivered by the motor (rotation of the motor will appear at the moment of contact, thereby implying an increase in the necessary torque and thus of current).

Contact between the pinion and the ring may also be detected by measuring deformation of the pinion, in particular by using a laser.

Another solution is to measure the movement of the pinion directly and to observe said movement slowing down or stopping upstream from the meshing position, e.g. by using a position sensor.

In order to avoid false detection of contact between the pinion and the ring, detecting an increase or a decrease of pressure may be made dependent on the movement Dp of the rod T of the actuator V, e.g. by using a position sensor for the rod of the actuator.

The pressure sensor Cp need not be arranged on the cylinder of the actuator, and by way of example it may be arranged on the hydraulic circuit between the actuator V and the supply Rv.

The invention claimed is:

1. An engagement method for engaging a first gear element with a second gear element, at least the second gear element being mounted to move between a meshing position and a disengaged position by means of an actuator, the engagement method including a step of driving at least one of the gear elements in rotation so as to establish a non-zero difference in speed of rotation between said gear elements, and a step of controlling the actuator to perform the following in succession:
   moving at least the second gear element towards the meshing position;
   at the moment contact is detected between the gear elements, stopping the movement of the second gear element towards the meshing position; and
   when a relative angular position of the gear elements allowing the engagement of said gear elements is detected, moving the second gear element into the meshing position as quickly as the actuator is capable of going.

2. The engagement method according to claim 1, wherein the actuator comprises a cylinder within which a rod can move along an axis, a free end of the rod being connected to the second gear element and an end of the rod forming a piston cooperating with the cylinder to define a chamber connected to a source of pressurized fluid via a servo valve serving to control the pressure inside the chamber, and wherein:
   the step of moving the second gear element towards the meshing position is carried out by increasing the pressure inside the chamber via the servo valve to reach a predetermined pressure so as to move the rod of the actuator towards the meshing position;
   the step of detecting contact between the gear elements is carried out by detecting an increase of the pressure inside the chamber up to a first threshold;
   the step of stopping the movement of the second gear element towards the meshing position is carried out by controlling the pressure inside the chamber via the servo valve so as to stop the rod advancing towards the meshing position;
   the step of detecting a relative angular position of the gear elements allowing the engagement of said gear elements is carried out by detecting a decrease of the pressure inside the chamber down to a second threshold for a predefined duration;
   the step of moving the second gear element into the meshing position as quickly as the actuator is capable of going is carried out by increasing the pressure inside the chamber via the servo valve as quickly as said servo valve is capable of going to bring the rod into the meshing position.

3. The engagement method according to claim 2, wherein the first pressure threshold is substantially equal to 30 bars.

4. The engagement method according to claim 2, wherein the second pressure threshold is substantially equal to 20 bars.

5. The engagement method according to claim 2, wherein the predefined duration is substantially equal to 100 ms.

6. A drive device comprising a first gear element (1), a second gear element (2) movable by means of an actuator (V) between a meshing position with the first gear element and a disengaged position, a motor driving one of the gear elements in rotation, detector means (Cp) for detecting contact between said gear elements, and an electronic control unit (UC) connected to the actuator (V), to the motor, and to the detection means (Cp), the drive device being characterized in that the electronic control unit (UC) is arranged to perform the method according to claim 5.

7. A drive device according to claim 6, wherein the actuator comprises an actuator (V) having a rod (T) connected to the second gear element, a servovalve (Sv) controls the actuator (V), and the detector means comprise a pressure sensor (Cp).

8. A drive device according to claim 7, wherein the actuator (V) is a hydraulic actuator.

9. A drive device according to claim 7, wherein the motor is an electric motor.

10. An undercarriage fitted with a drive device according to claim 7.

11. A drive device according to claim 6, wherein the first gear element (1) is a toothed ring and the second gear element (2) is a roller pinion.

12. A drive device according to claim 11, wherein the toothed ring (1) is secured to a wheel (R).

\* \* \* \* \*